Aug. 14, 1956     S. D. ROSS     2,759,131
ELECTROLYTIC DEVICE
Filed Jan. 2, 1953
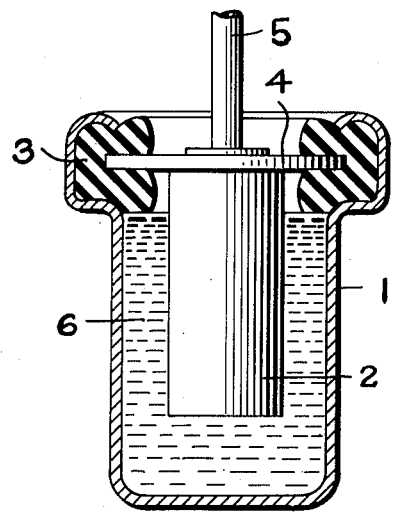
INVENTOR.
SIDNEY D. ROSS
BY
*Connolly and Hutz*
HIS ATTORNEYS

United States Patent Office 2,759,131
Patented Aug. 14, 1956

2,759,131

ELECTROLYTIC DEVICE

Sidney D. Ross, Williamstown, Mass., assignor to Sprague Electric Company, North Adams, Mass., a corporation of Massachusetts Application January 2, 1953, Serial No. 329,275

3 Claims. (Cl. 317—230)

The present invention relates to new and improved electrolyte and to electrolytic devices, such as, specifically, electrolytic capacitors utilizing the same.

In order to function satisfactorily in an electrolytic capacitor, an electrolyte must have a number of properties. It must not be corrosive to the various materials with which it comes in contact during use of the capacitor, and in addition, it must not be corrosive to the various pieces of apparatus which are usually utilized in association with capacitors and the like containing such electrolytes. Obviously, if the electrolyte fails in either of these two important respects, its applications are severely limited.

Also, electrolytes for use with such apparatus as electrolytic capacitors must be stable over a wide range of temperatures, and must possess relatively high boiling points and comparatively low freezing points. In order that an electrolytic unit containing such an electrolyte possess relatively constant operating characteristics over a wide range of temperatures, this electrolyte must have what amounts to a substantially constant temperature coefficient of conductivity. It follows almost without saying that the electrolyte must be conductive over this same range of temperatures.

In addition to possessing relatively high conductivity, an ideal electrolyte for electrolytic capacitors is required to have good film-forming and maintaining properties, both during use, as well as during operation of an electrolytic unit. Its surface tension must be such that when utilized in units having relatively small passages for the electrolyte to traverse in coming in contact with all portions of formed electrodes, that it can penetrate these passages with relative ease.

Also, one major characteristic of a satisfactory electrolyte for commercial applications is that it must be relatively cheap in cost. The field of electrolytic condensers today is highly competitive, and the difference of a few cents in the total cost of the unit may mark the difference between success and failure commercially.

A great many compositions have been suggested as electrolytes and practically all of them have been seriously deficient in one or more of the above desiderata. One of the most frequent causes of difficulty results from the limited operational range of aqueous electrolytes by reason of the inability of the solute to materially depress the freezing point or raise the boiling point.

It is an object of the present invention to overcome the foregoing and related disadvantages of the prior art, and to produce an electrolyte which is highly advantageous because of its superior properties in practically all of the above criteria. A further object is to produce electrical components, such as electrolytic capacitors, utilizing this electrolyte. These and further objects of the present invention, as well as the advantages of it, will be apparent from the following description and claims, as well as the appended drawing in which:

The figure shows a partially cross-sectional view of an electrolytic capacitor employing an electrolyte of the present invention.

Briefly, the objects of the invention are achieved by forming an electrolyte consisting of an aqueous solution of a lithium, sodium, or a potassium salt of acetic or formic acid, and utilizing this electrolyte in appropriate devices of the indicated category.

In its more limited embodiments, the present invention is concerned with electrolytic capacitors employing formed tantalum anodes which use the above indicated electrolyte. In one of the preferred species of the invention this anode is a compressed sintered porous pellet of the broad type shown in the R. U. Clark Patent No. 2,359,970.

The sodium, potassium, or lithium salts of acetic or formic acids discussed above are highly soluble in water and readily ionize in this solvent, and thus present substantially no difficulty with respect to conductivity. Obviously, the amounts of any of these solutes employed in an aqueous electrolytic solution will vary, depending upon the specific application involved. In general, it is preferred to use one or more amounts of the above solutes to form an aqueous electrolyte in which the conductance corresponds substantially to the point of maximum conductance determined as a result of plotting conductivity for varying amounts of the solute in water. Those skilled in the art will be, of course, able to determine this point with a minimum of experimentation. For many of the preferred electrolytes it appears to be best to use in excess of 15 moles of the alkali metal salts indicated per liter of solution.

The actual application of the present invention is most easily explained with reference to the appended drawing showing the preferred species of electrolytic capacitors utilizing the indicated electrolytes. Here there is shown an aluminum can 1 containing a tantalum powdered anode 2 of the type described in the aforesaid Clark patent. This anode is held within the can by means of a gasket 3 attached to a top flange 4 positioned around the base of the anode 2. Connected to this flange is an appropriate terminal lead 5. The electrolyte 6 fills the space between can 1 and the anode 2, and consists in this example of a 20 molar aqueous solution of potassium formate.

The fact that a single species of the electrolytic capacitors of the invention has been illustrated is not to be taken as detracting from the utility of those electrolytes shown and described with any of the conventionally formed anodes presently used in the condenser industry. In particular, the electrolytic solutions described can be used with various etched foil units, with the so-called fabricated plate type of electrolytic capacitor, as well as with still other specialized constructions. Although the preferred metal for use with these electrolytes is tantalum because of its resistance to corrosion, availability, and ease of formation, manipulation, etc., other metals, such as aluminum, moylbdenum, palladium, etc., can also be used with varying results.

All of these materials, when used with the present invention are preferably formed in the various means known and used in the art, although it is possible to form them in the specific electrolytes herein set forth. This formation procedure with tantalum normally involves the oxidation of an electrode in a bath saturated with phosphoric acid or a similar compound by holding it in such a bath while making it the anode of an electrolytic system and while subjecting it to a current of approximately 40 amps. until a voltage of around 400 volts is reached and then continuing this voltage until the current decreases to substantially zero.

It is possible to utilize any of the common gelling agents employed in the art so as to form solid or semi-solid electrolytes using the aqueous solutions herein set forth. Such materials include polyvinyl alcohol, gum tragacanth, carboxy methyl cellulose, and the like. Secondary ingredients of various types such as the common glycols, other nonionic solvents, as well as various ion forming compounds or mixtures of these and related compounds can be employed with the present electrolytes. However, for most purposes it is believed to be preferred to use the specific solutes shown either alone or in combination with one another. Satisfactory electrolytes coming within the scope of the present disclosure are 6.0 molar aqueous solutions of lithium acetate and 9.0 molar solutions of sodium formate.

Various other modifications of the present inventive concept may be made by those skilled in the art without departing from the scope thereof. Such modifications are to be considered as part of the invention insofar as they are defined by the appended claims.

What is claimed is:

1. An electrolytic condenser comprising an oxide filmed electrode of a metal selected from the group tantalum and aluminum, another electrode, and an aqueous electrolytic solution containing a cation selected from the class consisting of lithium, sodium, and potassium, and an anion selected from the class consisting of acetate and formate ions, said solution being at least 6 molar in concentration.

2. An electrolytic condenser having a tantalum anode with an in situ formed surface oxide coating, and as the electrolyte an aqueous solution of potassium formate.

3. An electrical capacitor comprising an aluminum container enclosing a compressed porous oxide filmed tantalum anode, and an aqueous solution having cations selected from the class consisting of lithium, sodium and potassium, and anions of the class consisting of acetate and formate.

References Cited in the file of this patent

UNITED STATES PATENTS

| 2,022,500 | Clark | Nov. 26, 1935 |
| 2,368,688 | Taylor | Feb. 6, 1945 |

FOREIGN PATENTS

| 384,647 | Great Britain | Mar. 4, 1931 |
| 707,091 | Great Britain | July 2, 1931 |
| 643,945 | France | Sept. 25, 1928 |